(12) United States Patent
McIlrath

(10) Patent No.: US 7,384,084 B2
(45) Date of Patent: Jun. 10, 2008

(54) GARDEN TOOL

(76) Inventor: Barbara S. McIlrath, 2235 Rackley Rd., Brooskville, FL (US) 34605

( * ) Notice: Subject to any disclaimer, the term of this patent is extended or adjusted under 35 U.S.C. 154(b) by 0 days.

(21) Appl. No.: 11/608,421

(22) Filed: Dec. 8, 2006

(65) Prior Publication Data

US 2007/0138816 A1     Jun. 21, 2007

Related U.S. Application Data

(60) Provisional application No. 60/752,458, filed on Dec. 21, 2005.

(51) Int. Cl.
*A01B 1/02*     (2006.01)
(52) U.S. Cl. .................... 294/50.8; 294/118
(58) Field of Classification Search ................. 294/16, 294/50.8, 55, 118
See application file for complete search history.

(56) References Cited

U.S. PATENT DOCUMENTS

| | | | | |
|---|---|---|---|---|
| 208,703 A | * | 10/1878 | Avery | .................. 111/101 |
| 488,817 A | * | 12/1892 | Jones | .................. 294/50.5 |
| 752,115 A | * | 2/1904 | Smith | .................. 294/50.8 |
| 851,987 A | * | 4/1907 | Hewitt | .................. 294/118 |
| 1,857,979 A | * | 5/1932 | Schaefer | .................. 294/118 |
| 1,970,087 A | * | 8/1934 | Gonsalves | .................. 111/101 |
| 2,639,935 A | * | 5/1953 | Foulke | .................. 111/101 |
| 3,301,585 A | * | 1/1967 | Johnson | .................. 294/118 |
| 5,836,629 A | * | 11/1998 | Hobart | .................. 294/1.3 |
| 6,092,847 A | * | 7/2000 | Kwan | .................. 294/16 |
| 6,338,512 B1 | | 1/2002 | Ruppert et al. | |

* cited by examiner

*Primary Examiner*—Dean J Kramer
(74) *Attorney, Agent, or Firm*—Harness, Dickey & Pierce, PLC

(57) ABSTRACT

A device for preparing holes in soil for planting bulbs or small plants includes a pair of mutually opposing members including scoops located along the distal portions thereof. The tool is spring biased to a normally open position for insertion into the soil. To remove soil, the handles are squeezed together, which in turn closes the scoops to entrap soil for removal.

15 Claims, 5 Drawing Sheets

US 7,384,084 B2

GARDEN TOOL

FIELD OF THE INVENTION

The present disclosure relates to a single handed small garden tool used to dig a hole in prepared soil to accept a small plant or bulb.

BACKGROUND OF THE INVENTION

In the past, several soil diggers have been made which included complicated mechanisms that are expensive to manufacture and prone to sticking and malfunctioning. U.S. Pat. No. 6,338,512 shows a vertical motion for closing the diggers together through the use of a toggle mechanism device that pulls the two scoops together when the vertical motion is performed. This device, whose use is taught in the '512 patent, is inserted (pushed) into the soil with a vertical motion that limits the force that can be applied to the digger. In some cases, where the soil is heavy, this vertical motion could cause user fatigue very quickly. Also, the complicated toggle mechanism takes considerable force to close and can be prone to sticking.

Larger diggers, such as post hole diggers, have been in use for many years. This type of digger is two handled in use, and was designed to make large holes in the soil, mostly to accommodate wooden fence posts.

Post hole diggers are operated by holding the long handles closely together to maintain the diggers in the open position. The post hole digger is then driven into the soil in a vertical motion. When the digger comes to a stop, the handles (one in each hand), are pulled away from each other, closing the two diggers, entrapping the soil between the scoops. Pulling the digger out of the soil will remove the trapped soil and leave a hole in the earth. Often, repeated cycles of this digger are required to get to the correct depth of the desired hole.

SUMMARY OF THE INVENTION

The present invention is a gardening tool including mutually opposing scoops which is normally held in its ready to use, open position.

The primary objective of the present invention is to make a pot hole digger that makes a hole in one cycle. The pot hole digger is low cost, substantially maintenance free and can be operated by one hand, leaving the other hand free to plant a flower or bulb, for example.

The tool is easy closing, with minimum effort, by pulling together the scoops in a horizontal manner.

While in operation, the tool is self-aligning wherein the right handle controls the left scoop and the left handle controls the right scoop.

DETAILED DESCRIPTION

Figure 1:
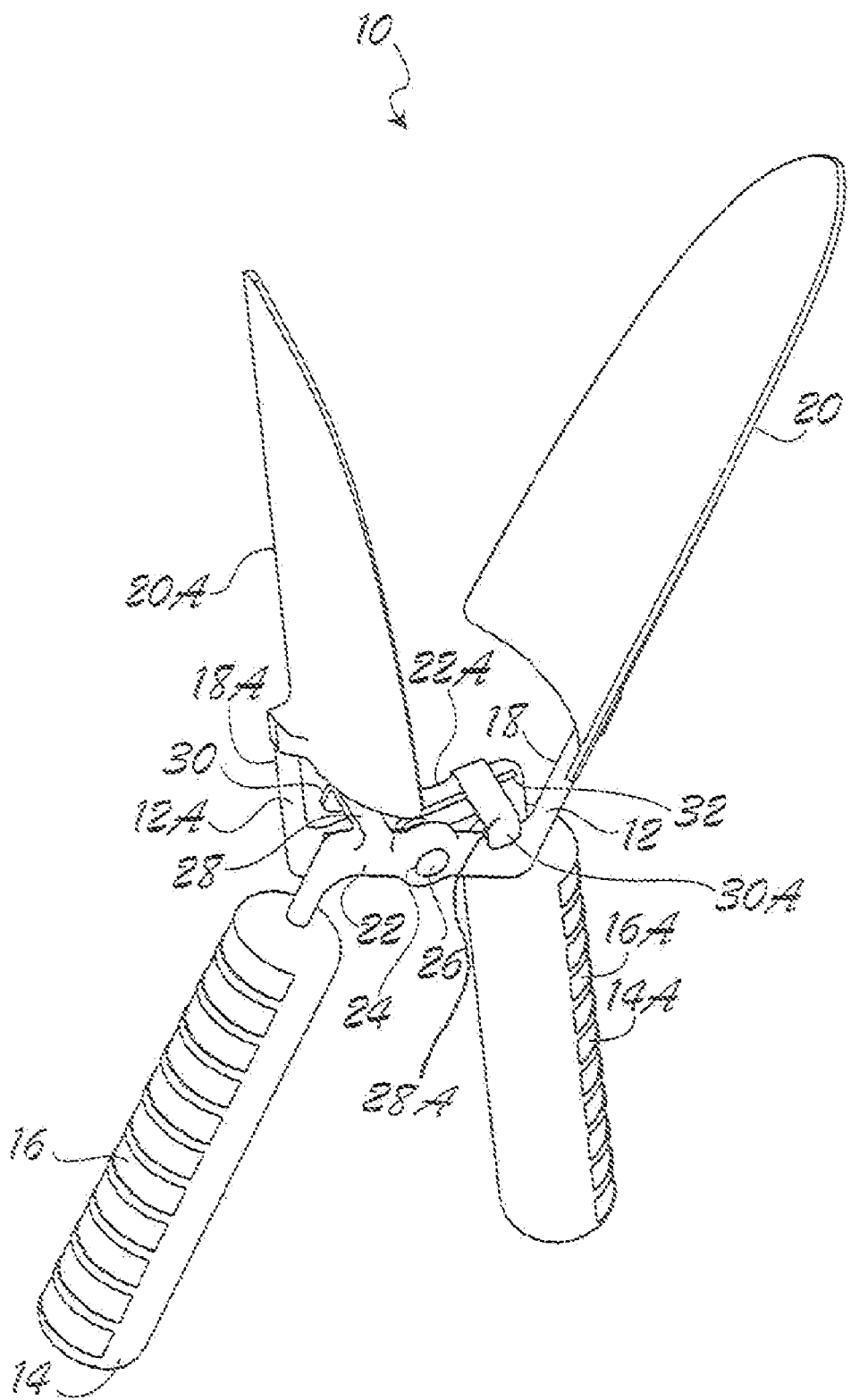
FIG. 1 is a perspective view of the pot hole digger.

Referring to FIG. 1, there is shown a gardening tool, otherwise referred to herein as a pot hole digger 10, in accordance with the teachings of the present invention. As noted above, the tool is ideally suited for use in preparing the soil to accept small plants and/or bulbs. The tool is capable of being used in a single handed manner there by freeing up the user's other hand for planting, for example.

The tool 10 generally includes mutually opposing first and second members 12 and 12A, respectively, which are mirror images of each other. As such, common reference numerals will be utilized hereinafter to designate like components of the tool.

Figure 2:
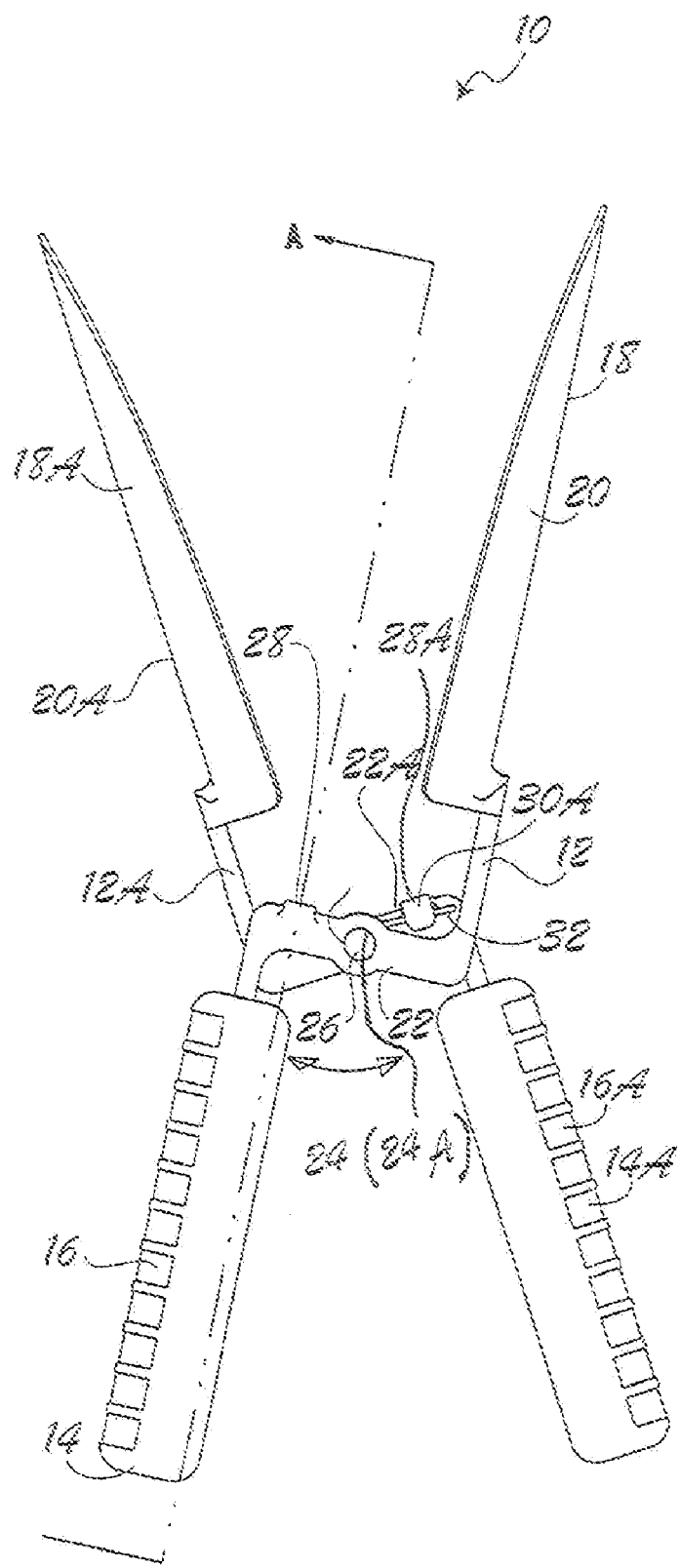
FIG. 2 is a side view of the pot hole digger shown in a normally open position.
Figure 3:
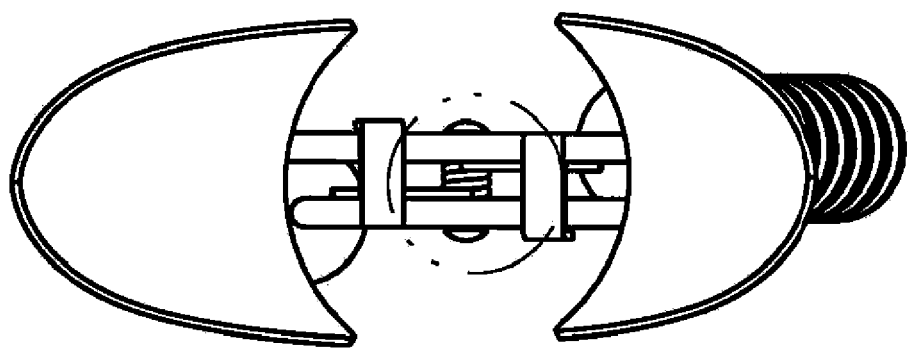
FIG. 3 is a top view of the pot hole digger.
Figure 4:
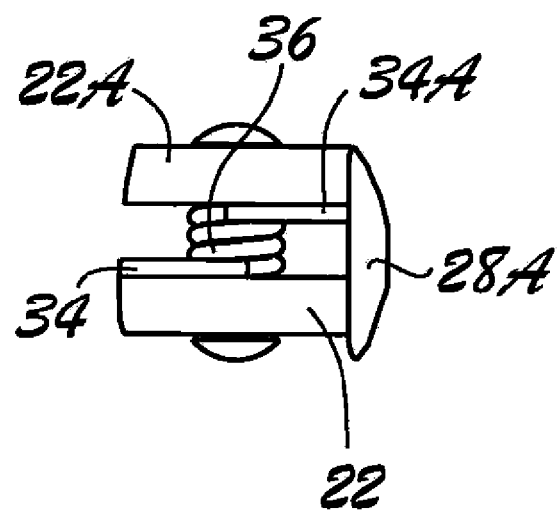
FIG. 4 is a sectional view taken along reference A of FIG. 2.

With particular reference to FIG. 2, a first member 12 is shown to include a lower leg portion 14, a horizontal crossbar 22 and an upper leg portion 18 which is offset from the lower leg portion. The leg portion 14 has disposed thereon an ergonomic handle 16 which is press fit or molded onto the lower leg portion as is known in the art. While not shown, the lower leg portion 14 may include means for retaining the ergonomic handle thereupon such as tabs, holes, or other known elements. The crossbar 22 which extends substantially perpendicularly from the lower leg portion 14 includes a centrally disposed aperture 24 for receiving a pivot pin 26 which will be described in further detail below.

The offset upper leg portion 18 which extends substantially 180° from the lower leg portion includes along its distal end a scoop 20 which, in association with the opposing scoop 20A of the second member 12A, serves to remove the soil as desired.

Likewise, the second member 12A also includes a lower leg portion 14A, a horizontally disposed crossbar 22A, and an upper portion 18A inclusive of a scoop 20A along the distal end thereof. Again, the crossbar 22A includes an aperture 24A through which pivot pin 26 extends. Thus, as best shown in FIG. 2, first and second members 12 and 12A are substantially Z-shaped along the length thereof.

At least one, and preferable both, of the crossbars 22 and 22A include an inwardly extending flange 28 and/or 28A which projects in the direction of the other crossbar. Preferably, such a flange 28 and/or 28A includes a down turned end 30 and/or 30A which extends just beyond the crossbar of the opposing crossbar. The flange 28 and/or 28A is generally disposed between the pivot pin 26 and the junction of the lower leg portion and crossbar from which it extends.

Figure 5:
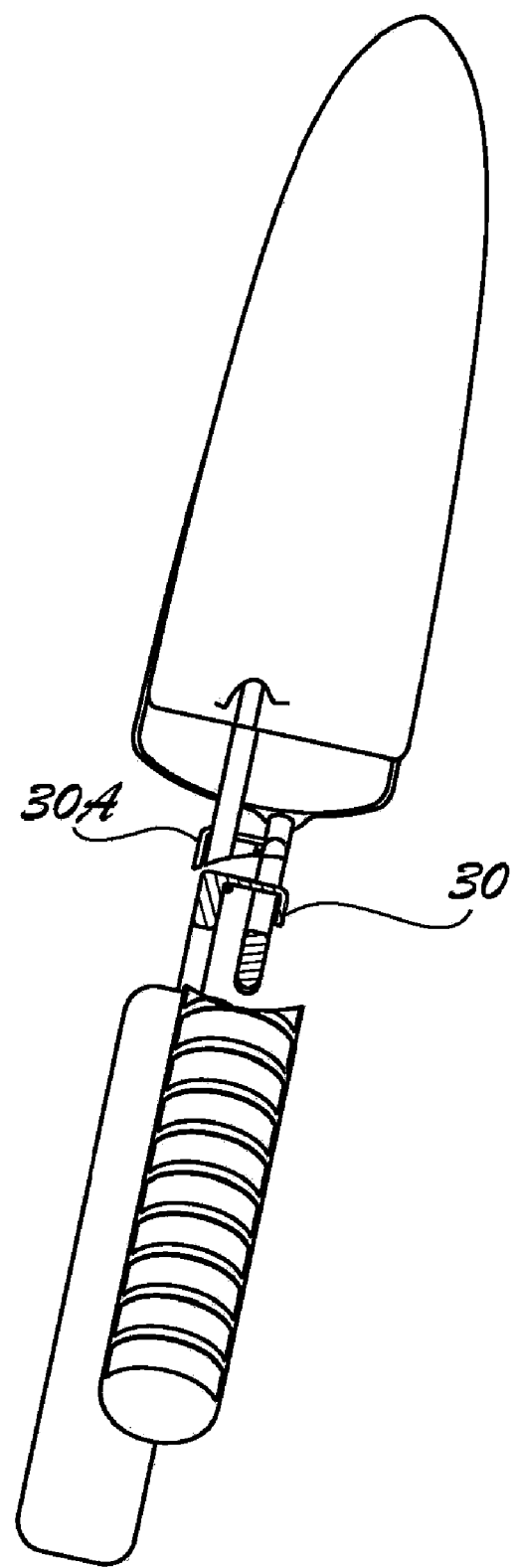
FIG. 5 is a side view of the pot hole digger shown in a closed position.
Figure 6:
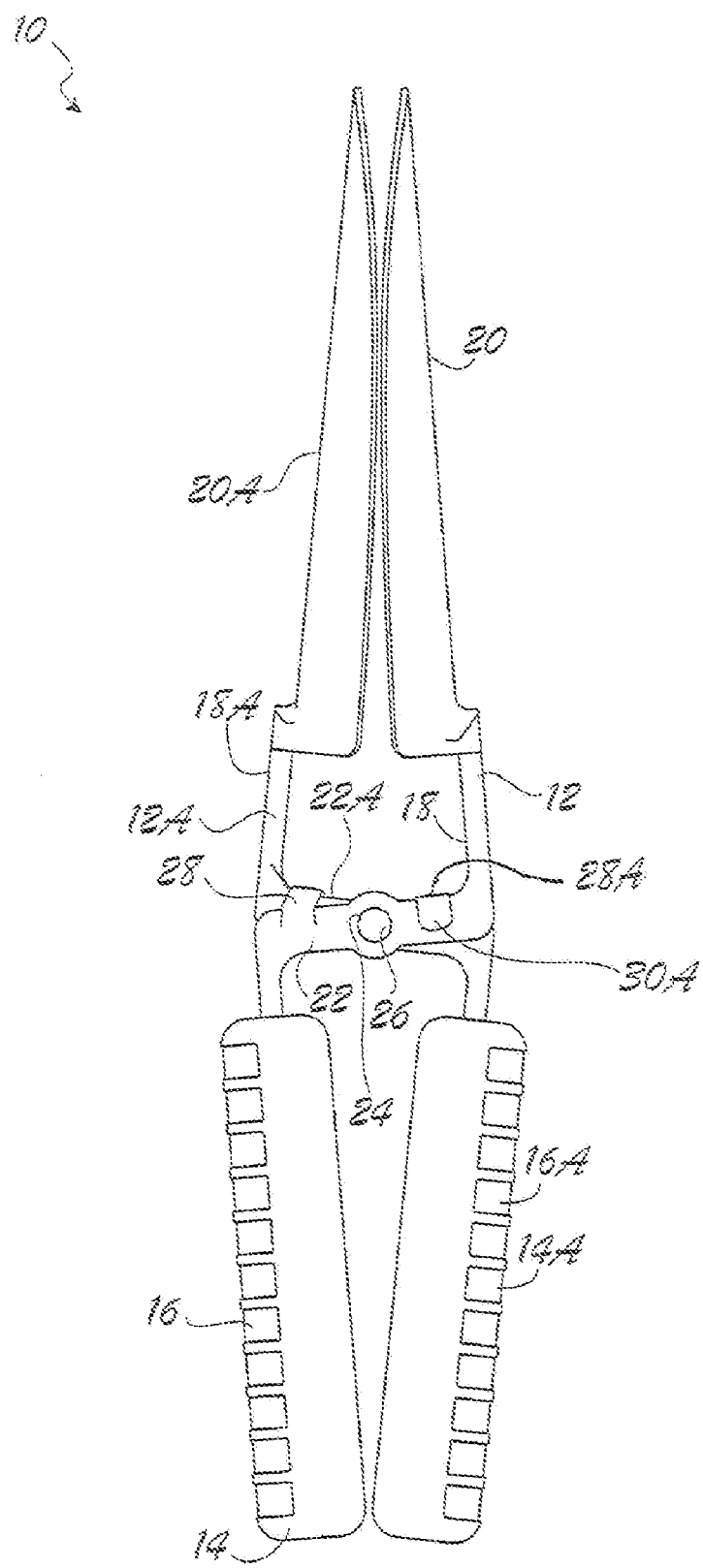
FIG. 6 is a side view of the pot hole digger shown in a normally closed position.

Located between the first and second members 12 and 12A, in proximity to the crossbars 22 and 22A, is a torsion spring 32 through which pin 26 extends. The torsion spring 32 includes one or more arms for engaging the flange(s) of the crossbar to assist in positioning the tool. Preferably, the torsion spring is in the form of a helically coiled body 36 having a first arm 34 extending along one end of the spring in the direction of flange 28 and along its opposite end is arm 34A extending in the direction of flange 28A. The torsion spring may be disposed on the crossbar 22 or 22A and may not extend beyond the crossbar 22 or 22A to reach the handles 16 and 16A and the scoops 20 and 20A. The spring force of the torsion spring 32 is sufficient to exert force on the flanges 28 and 28A which in turn cause the legs to move about the pivot pin 26 so that the scoops 20 and 22A are held in a normally open position, as shown in FIG. 2. In this normally open position, the scoops 20 and 20A extend outwardly and away from each other to define and acute angle. In addition, to providing a contact point for the torsion spring arm(s), the flange(s) provide a stop mechanism applied to the opposing crossbar thereby limiting pivotal rotation and closure of the tool as shown in FIG. 5.

In use, the pot hole digger is held in a horizontal position with arm extended, then raising the arm holding the digger upward approximately 30 to 45° from horizontal, then moving the arm downward, taking advantage of the lever action to increase the force as the digger enters the soil. The cantilever advantage of the design of the pot hole digger reduces the strain on the arm used in the operation of the digger, yet increases the force of the digger.

Operation of the pot hole digger 10 is as follows:

With the pot hole digger in the open position, place the digger in either hand and hold it in a vertical position by handles 16 or 16A;

With arm in horizontal position holding the digger in a vertical position, raise the arm upward to approximately 30 to 45° from horizontal;

Lower the holding arm at a comfortable rate of speed until the scoops 20 and 20A have entered the soil and come to a stop;

When the digger is fully inserted into the soil, pull handles 16 and 16A together, compressing torsion spring 32. This will bring scoops 20 and 20A together, trapping the soil between the scoops;

When the handles 16 and 16A are substantially together, pull the pot hole digger out of the soil in a vertical motion;

With the pot hold digger out of the soil, by releasing the hand holding the handles 16 and 16A, the bias spring 32 will push the scoops apart in order to deposit the trapped soil outside the hole. This bias spring action will return the pot hole digger to its pre-set open position, limited by the flanges 28 and 28A, respectively, which are attached to crossbars 22 and 22A.

The present claimed invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. A handheld gardening tool comprising:
    a first member including a first end having a handle, a second end including a scoop and a crossbar disposed between the first and second ends;
    a mutually opposed second member including a first end having a handle, and a second end including a scoop and a cross bar disposed between the first and second ends;
    a pivot pin connecting said first and second members and provided between the first end and the second end of the first member, and between the first end and the second end of the second member; and
    a torsion spring coupled to said pivot pin and biased against said first and second members thereby forcing the scoops of said first and second members into a spaced apart, normally open position, when the scoops are in the normally open position, the scoops extending away from each other to define an acute angle;
    wherein at least one of said crossbars include a flange for limiting pivotal rotation.

2. The gardening tool of claim 1 wherein the first end of said first and second members extend from one end of said crossbar and, a second end of said first and second members extends from a second end of said crossbar such that the second end of said first and second members is offset from the first end of said first and second members.

3. The gardening tool of claim 2 wherein said first and second members are substantially Z-shaped.

4. The gardening tool of claim 1 wherein both crossbars include a flange extending in the direction of the opposing member for limiting pivotal rotation in the closed position.

5. The gardening tool of claim 1 wherein said torsion spring includes a helically coiled body having at least one arm extending therefrom which engages said flange to cause pivotal rotation of said first and second members thereby positioning the scoops in a spaced apart relationship.

6. The gardening tool of claim 5 wherein the torsion spring includes first and second arms extending outwardly from opposing ends of said helically coiled body such that each of said arms engage a crossbar flange to assist in biasing the tool into a normally open position.

7. The gardening tool of claim 1, wherein the torsion spring is disposed on the crossbar and does not extend to any of the first end and the second end of the first member and the first end and the second end of the second member.

8. A handheld gardening tool for forming small holes in soil comprising:
    a first member including a first end having a handle, an offset second end including a scoop, and a crossbar extending between said first and second ends;
    a mutually opposing second member including a first end having a handle, an offset second end including a scoop, and a crossbar extending between said first and second ends;
    a pivot pin coupling said first and second members along said crossbar; and
    a torsion spring positioned between and biased against said crossbars thereby forcing the scoops of said first and second members into a spaced apart normally open position, wherein at least one of said crossbars include a flange extending in the direction of the opposing member for limiting pivotal rotation in the closed position.

9. The gardening tool of claim 8 wherein said first and second members are substantially Z-shaped.

10. The gardening tool of claim 8 wherein both crossbars include a flange extending in the direction of the opposing member for limiting pivotal rotation in the closed position.

11. The gardening tool of claim 8 wherein said torsion spring includes a helically coiled body having at least one arm extending therefrom which engages said flange to cause pivotal rotation of said first and second members thereby positioning the scoops in a spaced apart relationship.

12. The gardening tool of claim 11 wherein the torsion spring includes first and second arms extending outwardly from opposing ends of said helically coiled body such that each of said arms engage a crossbar flange to assist in biasing the tool into a normally open position.

13. The gardening tool of claim 8, wherein when the scoops are in the normally open position, the scoops extend away from each other to define an acute angle.

14. A handheld gardening tool for forming small holes in soil comprising:
    a first member including a first end having a handle, an offset second end including a scoop, and a crossbar joining said first and second ends including a transverse flange extending toward said first member;
    a mutually opposing second member including a first end having a handle, an offset second end including a scoop, and a crossbar joining said first and second ends including a transverse flange extending toward said second member;

a pivot pin coupling said first and second members along said crossbars; and a torsion spring including a helically coiled body disposed over said pivot pin having first and second arms extending outwardly from opposing ends thereof, said first and second arms being biased against said flanges thereby forcing the scoops of said first and second members into a spaced apart, normally open position.

15. The gardening tool of claim 14 wherein said first and second members are substantially Z-shaped.